(12) United States Patent
Cook et al.

(10) Patent No.: US 7,523,533 B2
(45) Date of Patent: Apr. 28, 2009

(54) PIPE JOINER

(76) Inventors: Robert D Cook, P.O. Box 275, Cheshire, OR (US) 97419-0275; Thomas H Kessler, 4290 High St., Eugene, OR (US) 97405

( * ) Notice: Subject to any disclaimer, the term of this patent is extended or adjusted under 35 U.S.C. 154(b) by 0 days.

(21) Appl. No.: 11/485,497

(22) Filed: Jul. 11, 2006

(65) Prior Publication Data

US 2007/0209188 A1   Sep. 13, 2007

Related U.S. Application Data

(60) Provisional application No. 60/793,423, filed on Apr. 19, 2006, provisional application No. 60/780,900, filed on Mar. 8, 2006.

(51) Int. Cl.
*B23P 19/04* (2006.01)
(52) U.S. Cl. .............................. 29/267; 29/244; 29/278
(58) Field of Classification Search .................. 29/244, 29/267, 268, 278
See application file for complete search history.

(56) References Cited

U.S. PATENT DOCUMENTS

| 3,173,639 | A |   | 3/1965  | Dunn |        |
|-----------|---|---|---------|------|--------|
| 3,653,115 | A | * | 4/1972  | Perkins   | 29/237 |
| 3,708,196 | A |   | 1/1973  | Snell |    |
| D259,241  | S |   | 5/1981  | Lynch et al. |  |
| 4,493,139 | A | * | 1/1985  | McClure   | 29/267 |
| 4,748,730 | A | * | 6/1988  | George    | 29/237 |
| D318,790  | S |   | 8/1991  | Brooks |     |
| D343,113  | S |   | 1/1994  | Brooks |     |
| D365,271  | S |   | 12/1995 | Andryzeck et al. | |

* cited by examiner

*Primary Examiner*—David P Bryant
*Assistant Examiner*—Christopher M Koehler
(74) *Attorney, Agent, or Firm*—FSP LLC

(57) ABSTRACT

A pipe joiner includes a power assembly and first and second attachment retainers, each retainer configured to accept a pipe claw. A frame supports the first and second attachment retainers. The power assembly is coupled to the frame in such a manner that operating the power assembly draws the retainers toward one another.

15 Claims, 2 Drawing Sheets

PIPE JOINER

PRIORITY CLAIM

The present application claims priority as a utility application corresponding to subject matter of provisional patent application PIPE JOINER, having application No. 60/793,423, filed on Wednesday, Apr. 19, 2006.

The present application claims priority as a utility application corresponding to subject matter of provisional patent application PIPE CLAW, having application No. 60/780,900, filed on Thursday, Mar. 9, 2006.

TECHNICAL FIELD

The present disclosure relates to pipe joining.

BACKGROUND

Many types of pipe, including bell socket pipe, are laid in sections. These sections must be joined in the field, which may prove a difficult proposition due to large pipe diameters and rough terrain, among other factors. Conventional manners of joining pipe have proven inadequate or cumbersome.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A pipe joiner may include and/or involve a power assembly, a first attachment retainer and a second attachment retainer, each retainer configured to accept a pipe claw, and a frame supporting the first and second attachment retainers, the power assembly coupled to the frame in such a manner that operating the power assembly draws the retainers toward one another. The frame supporting the first and second attachment retainers may include and/or involve the frame including first and second telescoping sections. The power assembly may include and/or involve a lever arm pivotally coupled to a drive shaft, the drive shaft coupled to a first section of the frame, the lever arm coupled to a second section of the frame; and/or at least one of a pneumatic or hydraulic assembly, and/or a ratchet assembly, and/or a gear assembly, and/or a jackscrew and nut assembly.

The pipe joiner may include and/or involve each retainer formed to removably attach to the frame in different orientations.

The pipe joiner may include and/or involve each retainer formed to attach to the frame in up to four orientations.

The pipe joiner may include and/or involve a stop to inhibit inward flexing of the pipe claw when the retainers are drawn apart.

The pipe joiner may include and/or involve at least one groove, ring, or rod into which a handle of the pipe claw may slide.

The pipe joiner may include and/or involve a removable handle to extend the leverage of the power assembly.

The pipe joiner may include and/or involve at least two pipe claws.

The pipe joiner may include and/or involve each pipe claw including a handle and a hook sized to fit a diameter of a section of pipe. The hook sized to firmly engage with a section of pipe may include and/or involve a thin strong section of metal including an opening to receive the section of pipe, the opening having edges to bite down on the section of pipe when the pipe claw is flexed, and/or the handle of each pipe claw formed to slide into the retainers, and to rotate into a locked position.

A pipe joining process may include and/or involve sliding a first section of pipe into a recess in a first attachment, sliding a second section of pipe into a recess in a second attachment, applying force to urge the two attachments toward one another and to cause each attachment to flex away from the other, causing edges of each attachment to bite down and secure onto the pipe sections, and continuing to apply force to urge the pipe sections together.

The pipe joining process may include and/or involve applying reverse force to urge the attachments away from one another, causing the attachments to flex toward one another, and inhibiting the flexing of the attachments toward one another at a point where the attachments slide along the sections of pipe without biting down and securing onto the sections of pipe.

The pipe joining process may include and/or involve continuing to apply force to urge the pipe sections together, and then applying reverse force, alternately, until the pipe sections are joined.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

Pipe Joining Apparatus

Figure 1:
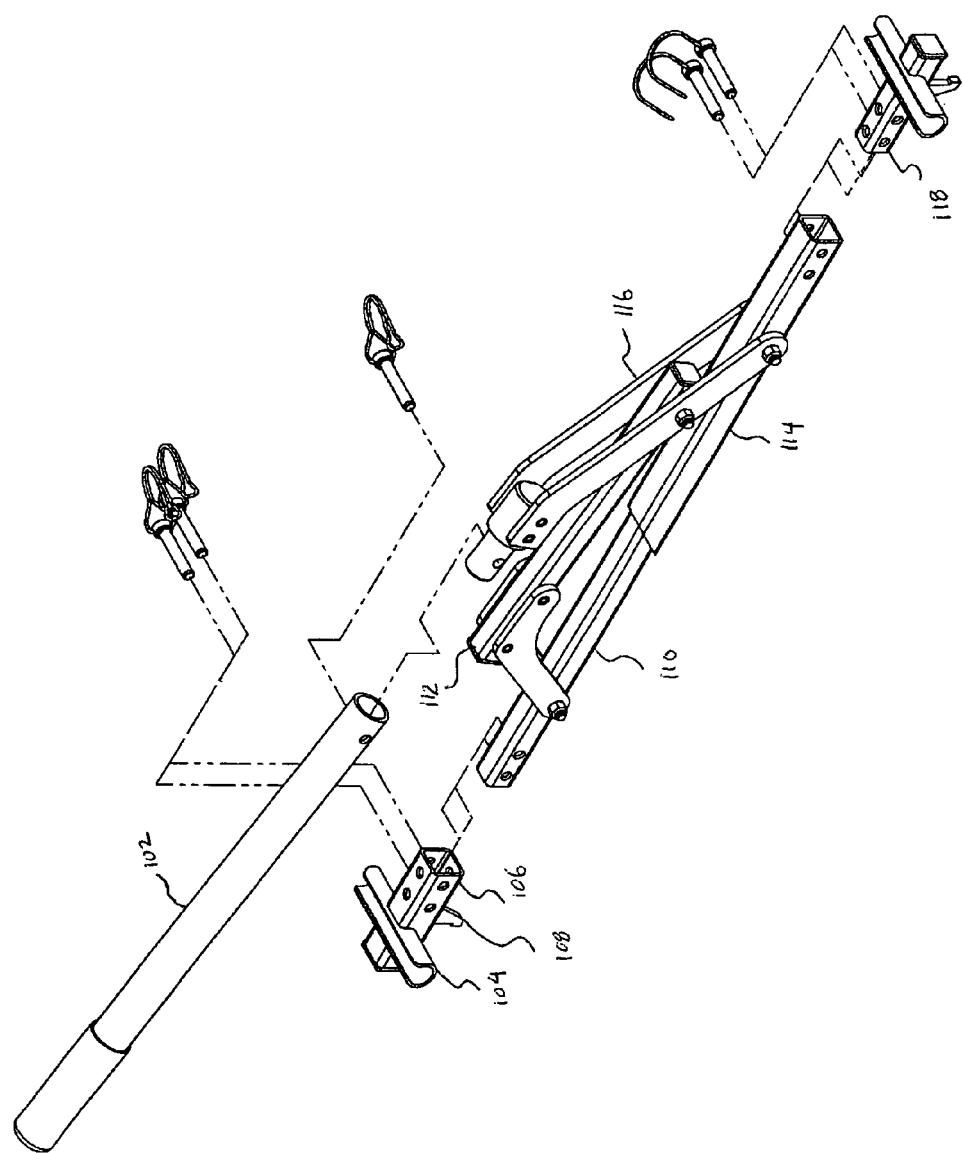
FIG. 1 is an illustration of an embodiment of a pipe joining apparatus.

FIG. 1 is an illustration of an embodiment of a pipe joining apparatus.

Power and Frame

The pipe joiner includes a power assembly 112 and 116, a first attachment retainer 106 and a second attachment retainer 118, each retainer configured to accept a pipe claw or other attachment, and a frame 110 and 114 supporting the first and second attachment retainers 106 and 118. Each retainer 106 and 118 includes an attachment piece (104 for retainer 106) into which a piece, such as a pipe claw, may be placed. A pipe claw (see FIG. 2) or other attachment may be used to secure a pipe section during a pipe joining operation. The power assembly 112 and 116 is coupled to the frame 110 and 114 in such a manner that operating the power assembly 112 and 116 draws the retainers 106 and 118 toward one another.

The retainers 106 and 118 and the frame 110 and 114 include holes such that a retainer 106 or 118 may be attached to a frame 110 or 114 by pins (two are shown for each retainer as illustrated) which passes through the holes. The rod or rods may comprise pins, or may constitute a bolt and may be held in place by a nut, among other possibilities. As illustrated, there may be various holes in the retainers 106 118 enabling them to be attached to the frame 110 114 such that the pipe claw or other attachment is oriented in varying manners with respect to the frame.

The frame may include first and second telescoping sections 110 and 114. Some embodiments may comprise sections which slide side by side, or even sections which fold with respect to one another. In some embodiments, sections that slide may have one section that is partially enclosed by another. For example, one section may have an attached rail, where the sides of the rail slide within the other section or something attached to the other section. As shown, there are two sections 110 and 114 used in a telescoping action. However, telescoping and or side by side sliding designs may include more than two sections. Embodiments including more than two sections may incorporate both telescoping and side by side sliding design, and/or folding action.

The power assembly may be manual, manual-assist, or fully powered. One example of a manual assembly, preferably for small diameter pipe, is shown in FIG. 1. A lever arm 116 is pivotally coupled to a drive shaft 112, with the drive shaft 112 coupled to a first section 110 of the frame, and the lever arm 116 coupled to a second section 114 of the frame. A handle 102 is attached to the lever arm 116 using holes/pins (may be bolts and nuts or other attachment mechanism). When the handle 102 is pulled upward away from the frame the lever arm 116 creates a force to draw the frame sections 110 and 114 together.

The retainers 110 and 118 are also drawn together. Attachment pieces (such as pipe claws), secured by the retainers 106 118 are also drawn together. Because the pipe sections are sitting within the pipe claws, they are "grabbed" by flexing of the pipe claws away from one another, and drawn together.

Fully-powered or power-assisted embodiments may include at least one of a pneumatic, electric, or hydraulic assembly. Other manual-type power assemblies may include a ratchet assembly and/or a gear assembly, and/or a jackscrew and nut assembly.

In manual modes, a removable handle 102 may be included, as illustrated, to extend the leverage of the power assembly.

Attachment Retainers

The pipe joiner includes assembly retainers 106 and 118 to secure the pipe grip attachments. The pipe grip attachments may comprise pipe claws as illustrated if FIG. 2.

Each retainer 106 118 is formed to removably attach to the frame in different orientations. This enables the openings of the pipe claws, or whatever attachment is used, to be employed in different orientations to facilitate field operation.

Square-section framing may be used. In that case each retainer 106 118 may be formed to attach to the frame in up to four orientations as illustrated. In other embodiments, fewer or additional orientations may be enabled. For example, hexagonal cross sectional framing may be employed to provide up to six orientations for the attachments.

A stop 108 may be included near each retainer to inhibit inward flexing of the pipe claw when the retainers 106 118 are drawn apart. In some situations it may be advantageous to "pump" the pipe joiner to effect a joining of pipe sections. In these situations, as the attachments are drawn apart they may bite down on the pipe and pull it apart, unless the stops 108 are employed to prevent biting.

The retainers may include at least one groove, ring, or rod 104 into which a handle of the pipe claw may slide. For example, FIG. 1 shows how a 'half-pipe' may be employed so that a rod-shaped attachment handle may slide easily into position.

Operation

Joining of pipe, for example pressure fitting one pipe into the flared (belled) end of another, may be accomplished by sliding a first section of pipe into a recess in a first attachment (e.g. a pipe claw), sliding a second section of pipe into a recess in a second attachment (e.g. another pipe claw), and then applying force via the power assembly to urge the two attachments toward one another. Urging the attachments toward one another causes each attachment to flex away from the other, in turn causing edges of each attachment to bite down and secure onto the pipe sections. Force is continually applied in this manner to urge the pipe sections together.

In some situations, a single operation of the power assembly will be insufficient to full join the pipe. In these situations, the pipe joiner may be "pumped". If the pipe joiner is fully manual, this may occur by moving the handle 102 up and then down one or more times. The down action of such pumping results in the application of a reverse force to urge the attachments away from one another. This causes the attachments to flex toward one another. The attachments will bite into the pipe if allowed to flex too far, and the reverse force will then operate to pull the sections of pipe apart. To inhibit this from occurring, flexing of the attachments toward one another is inhibited (e.g. by the stops 108) at a point that enables the attachments slide along the sections of pipe (e.g. when they attachments are substantially perpendicular with the pipe). The attachments then slide away from one another without biting down and securing onto the sections of pipe and pulling the sections apart.

Pumping may proceed by continuing to apply force to urge the pipe sections together, and applying reverse force, alternately, until the pipe sections are joined.

Attachment for the Pipe Joining Apparatus of FIG. 1

Figure 2:
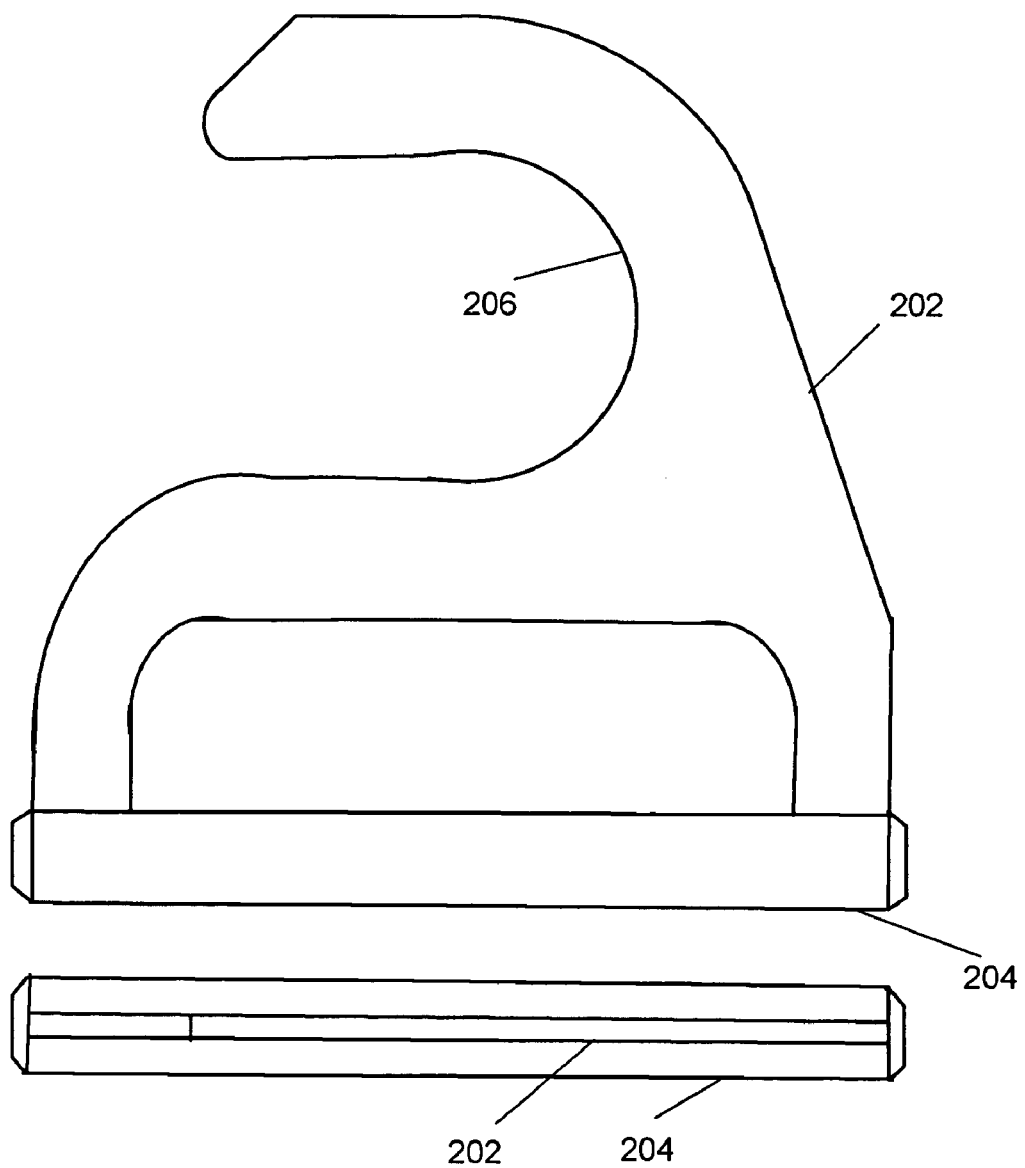
FIG. 2 is an illustration of an embodiment of an attachment for the pipe joining apparatus of FIG. 1.

FIG. 2 is an illustration of an embodiment of an attachment for the pipe joining apparatus of FIG. 1. Such an attachment may be referred to as a 'pipe claw'. The pipe claw constitutes a hook 202 having an opening 206 into which a pipe may be placed. The hook 202 also attaches to a pipe claw handle 204. FIG. 2 provides a side view and a top view of the pipe claw.

In one embodiment the pipe joiner employs at least two pipe claws. Each pipe claw includes a handle 204 and a hook 202, with the sweep 206 of the hook 202 sized to fit a diameter of a section of pipe.

The handle 204 of each pipe claw may be formed to slide into the retainers 106 118 of the pipe joiner, and to rotate into a locked position. For example, the handle 204 may be formed from a rod and fitted into a 'half-pipe' 104 of the retainer. The claw may then be rotated into a locked position by rotating the hook 202 so that the claw cannot slide out of the retainer during operation. If the hook 202 may be considered to be facing up or to be above the pipe joiner frame when the handle 204 is inserted into the half-pipe 104, the hook 202 may be rotated around the end of the frame such that it winds up when locked facing down, i.e., the hook 202 may be rotated 180 degrees to lock it into position for operation so that it cannot slide sideways out of the half-pipe 104.

The hook 202 may be formed from a thin strong section of metal including an opening 206 to receive the section of pipe, the opening 206 having edges to bite down on the section of pipe when the pipe claw is flexed.

What is claimed is:

1. A pipe joiner comprising:
   a power assembly;
   a first attachment retainer and a second attachment retainer, each retainer configured to accept a pipe claw; and
   each retainer formed to allow the pipe claw to flex substantially outward against a pipe received in the pipe claw when the retainers are drawn toward one another, and to inhibit inward flexing of the pipe claw against the pipe when the retainers are drawn apart from one another;
   a frame supporting the first and second attachment retainers, the power assembly coupled to the frame in such a manner that operating the power assembly draws the retainers toward one another.

2. The pipe joiner of claim 1, wherein the frame supporting the first and second attachment retainers further comprises:
   the frame comprising first and second telescoping sections.

3. The pipe joiner of claim 1, wherein the power assembly further comprises:
   a lever arm pivotally coupled to a drive shaft, the drive shaft coupled to a first section of the frame, the lever arm coupled to a second section of the frame.

4. The pipe joiner of claim 1, wherein each retainer comprises:
   each retainer formed to removably attach to the frame in different orientations.

5. The pipe joiner of claim 4, wherein the each retainer comprises:
   each retainer formed to attach to the frame in up to four orientations.

6. The pipe joiner of claim 1, wherein each retainer comprises:
   a stop to inhibit inward flexing of the pipe claw when the retainers are drawn apart.

7. The pipe joiner of claim 1, wherein each retainer comprises:
   at least one groove, ring, or rod into which a handle of the pipe claw may slide.

8. The pipe joiner of claim 1, wherein the power assembly further comprises:
   at least one of a pneumatic or hydraulic assembly.

9. The pipe joiner of claim 1, wherein the power assembly further comprises:
   a ratchet assembly.

10. The pipe joiner of claim 1, wherein the power assembly further comprises:
    a gear assembly and/or a jackscrew assembly.

11. The pipe joiner of claim 1, further comprising:
    a removable handle to extend the leverage of the power assembly.

12. The pipe joiner of claim 1, further comprising:
    at least two pipe claws.

13. The pipe joiner of claim 12, wherein the at least two pipe claws further comprise:
    each pipe claw comprising a handle and a hook sized to fit a diameter of a section of pipe.

14. The pipe joiner of claim 13, wherein the hook sized to firmly engage with a section of pipe further comprises:
    a thin strong section of metal comprising an opening to receive the section of pipe, the opening having edges to bite down on the section of pipe when the pipe claw is flexed.

15. The pipe joiner of claim 13, wherein the each pipe claw comprising a handle further comprises:
    the handle of each pipe claw formed to slide into the retainers, and to rotate into a locked position.

* * * * *